(No Model.)
L. D. FRENOT.
SLEEVE BUTTON.
No. 378,956.          Patented Mar. 6, 1888.
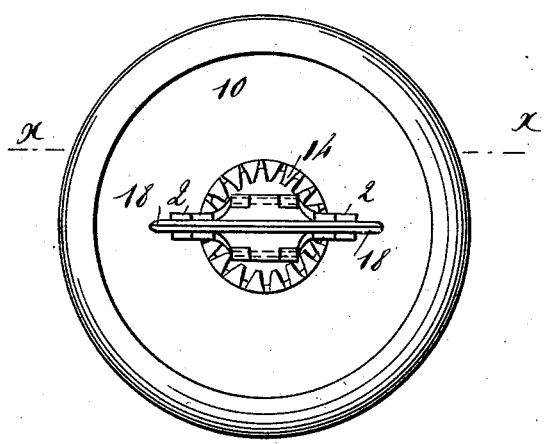
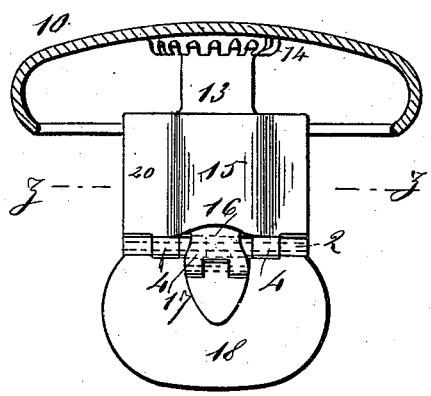
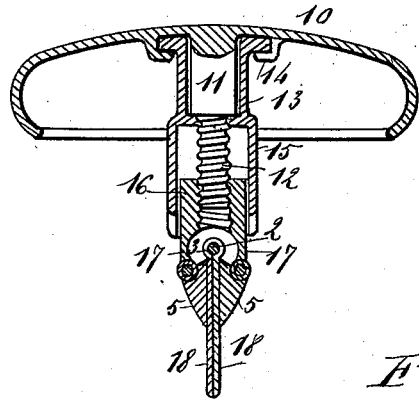
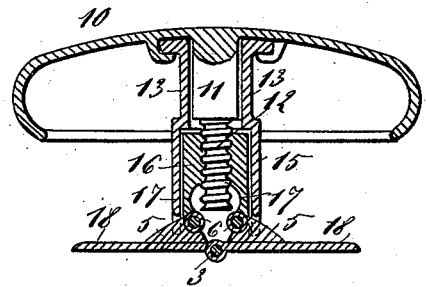
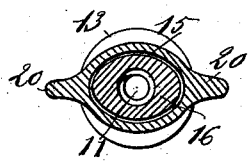
WITNESSES:
C. Neveux
C. Sedgwick
INVENTOR:
L. D. Frenot
BY Munn & Co.
ATTORNEYS.

UNITED STATES PATENT OFFICE.

LOUIS D. FRENOT, OF NEWARK, NEW JERSEY.

SLEEVE-BUTTON.

SPECIFICATION forming part of Letters Patent No. 378,956, dated March 6, 1888.

Application filed December 13, 1887. Serial No. 257,759. (No model.)

*To all whom it may concern:*

Be it known that I, LOUIS D. FRENOT, of Newark, in the county of Essex and State of New Jersey, have invented a new and Improved Sleeve-Button, of which the following is a full, clear, and exact description.

This invention relates to sleeve-buttons, the object of the invention being to provide for the passing of the shank of the button to a position such that it will rest within the button-holes of the cuff without subjecting said shank or the body of the button to any undue or excessive strain; and to this end the invention consists, essentially, of a threaded post secured to the body of the button, a sleeve surrounding said post, a nut with which the threaded post engages, said nut being arranged to slide within the sleeve, and two wings that are connected by hinge-joints one to the other and to the sleeve, each of the leaves being connected by other hinge-joints to arms that are formed upon the nut, all as will be hereinafter more fully described, and specifically pointed out in the claims.

Figure 1 is an inverted plan view of the button, the folding leaves being represented as they appear when in their closed position. Fig. 2 is a sectional view taken on line *x x* of Fig. 1. Fig. 3 is a sectional view taken on line *y y* of Fig. 1. Fig. 4 is a view similar to Fig. 3, except that the wings are represented as they appear when in their extended position, and Fig. 5 is a sectional view taken on line *z z* of Fig. 2.

In constructing such a button as the one forming the subject-matter of this application I provide a button body or face, 10, to which there is rigidly connected a post, 11, formed with a threaded extension, 12. About the post 11 there is fitted a sleeve, 13, which is held to the button-body by overturned ears 14. The upper portion of the sleeve 13 is circular, but the lower portion thereof is elliptical, or it might be irregularly-formed, and in this elliptical or irregularly formed section 15 there is fitted a nut, 16, having arms 17, to which arms there are hinged leaves 18, that are in turn connected to each other by a hinge-joint, 2, of which the pintle passes through eyes 4, that extend downward from the section 15 of the sleeve 13. The upper or outer faces of the leaves 18 are formed with bosses 5, in which there are formed eyes 6, which constitute one section of the hinge-joint by which the leaves 18 are connected to the arms 17 of the nut 16. At either side of the elliptical or irregularly-formed section of the sleeve there is an extending rib 20.

Such being the general construction of my improved form of button, the operation is as follows: If the sleeve 13 be held from turning, and the button-body be turned so that the nut 16 will be forced from said body by the action of the screw 12, the leaves 18 will be moved to the position in which they are shown in Figs. 1, 2 and 3, and while in this position may be passed through the button-holes of a cuff. Then if the body of the button be turned in a reverse direction the nut 16 will be drawn within the sleeve 13, and the leaves will be extended, as represented in Fig. 4, thus preventing the displacement of the button until the nut 16 has been again advanced.

From the above description it will be seen that all undue strain upon the body of the button will be avoided. Although most any form of button-body may be employed with the parts hereinbefore described, such parts will be found to be especially applicable for use in connection with buttons in which precious stones are set, as the settings of said stones will be relieved from strain, and consequently the jewels carried by said settings will not be liable to drop therefrom.

Having thus described my invention, I claim as new and desire to secure by Letters Patent—

1. The combination, with a button-body provided with a threaded post or shank, of a sleeve loosely connected to the button-body, a nut mounted within said sleeve and held against rotary motion, said nut being engaged by the threaded post or shank of the button-body, and leaves hinged to each other and to the nut, substantially as described.

2. The combination, with a button-body provided with a threaded post or shank, of a sleeve loosely connected to the button-body, a nut mounted within said sleeve and held against rotary motion, said nut being engaged by the threaded post or shank of the button-body, and leaves hinged to the sleeve and to the nut, substantially as described.

3. The combination, with a button-body, of a threaded post or shank, a sleeve loosely connected to the button-body and inclosing said post or shank, a nut mounted within the sleeve and held from turning thereby, said nut being engaged by the threaded post or shank, and leaves that are connected by a hinge-joint to each other and to the sleeve and by other hinge-joints to arms formed upon the nut, substantially as described.

LOUIS D. FRENOT.

Witnesses:
EDWARD KENT, JR.,
C. SEDGWICK.